(12) United States Patent
Skyllas-Kazacos

(10) Patent No.: US 7,320,844 B2
(45) Date of Patent: *Jan. 22, 2008

(54) VANADIUM/POLYHALIDE REDOX FLOW BATTERY

(75) Inventor: Maria Skyllas-Kazacos, Sylvania Heights (AU)

(73) Assignee: Newsouth Innovations Pty Limited, Sydney, Wales (AU)

( * ) Notice: Subject to any disclaimer, the term of this patent is extended or adjusted under 35 U.S.C. 154(b) by 624 days.

This patent is subject to a terminal disclaimer.

(21) Appl. No.: 10/487,135

(22) PCT Filed: Aug. 26, 2002

(86) PCT No.: PCT/AU02/01157

§ 371 (c)(1),
(2), (4) Date: Jul. 13, 2004

(87) PCT Pub. No.: WO03/019714

PCT Pub. Date: Mar. 6, 2003

(65) Prior Publication Data

US 2004/0234843 A1 Nov. 25, 2004

(30) Foreign Application Priority Data

Aug. 24, 2001 (AU) .................................. PR7221

(51) Int. Cl.
*H01M 8/20* (2006.01)
*H01M 10/36* (2006.01)

(52) U.S. Cl. ................... 429/105; 429/199; 429/302
(58) Field of Classification Search ............... 429/105, 429/199, 302

See application file for complete search history.

(56) References Cited

U.S. PATENT DOCUMENTS

| 3,057,760 | A | * | 10/1962 | Dereska et al. ............. 429/110 |
| 3,996,064 | A | | 12/1976 | Thaller |
| 4,107,401 | A | * | 8/1978 | Goodson et al. ......... 429/105 X |
| 4,786,567 | A | * | 11/1988 | Skyllas-Kazacos et al. ........ 429/105 X |
| 6,143,443 | A | | 11/2000 | Kazacos et al. |
| 6,720,107 | B1 | * | 4/2004 | Holtom et al. .............. 429/105 |
| 2005/0244707 | A1 | * | 11/2005 | Skyllas-Kazacos et al. ............ 429/105 |

FOREIGN PATENT DOCUMENTS

| EP | 0566019 | 1/1996 |
| WO | WO 89/05528 | 6/1989 |

* cited by examiner

*Primary Examiner*—Stephen J. Kalafut
(74) *Attorney, Agent, or Firm*—Welsh & Katz, Ltd.

(57) ABSTRACT

The invention relates to a redox flow cell containing a polyhalide/halide redox couple in the positive half-cell electrolyte and a V(III)/V(II) redox couple in the negative half-cell electrolyte. The invention also relates to a method of producing electricity by discharging the fully charged or partially charged redox flow cell, and a method of charging the discharged or partially discharged redox flow cell.

12 Claims, 5 Drawing Sheets

VANADIUM/POLYHALIDE REDOX FLOW BATTERY

TECHNICAL FIELD

Figure 1:
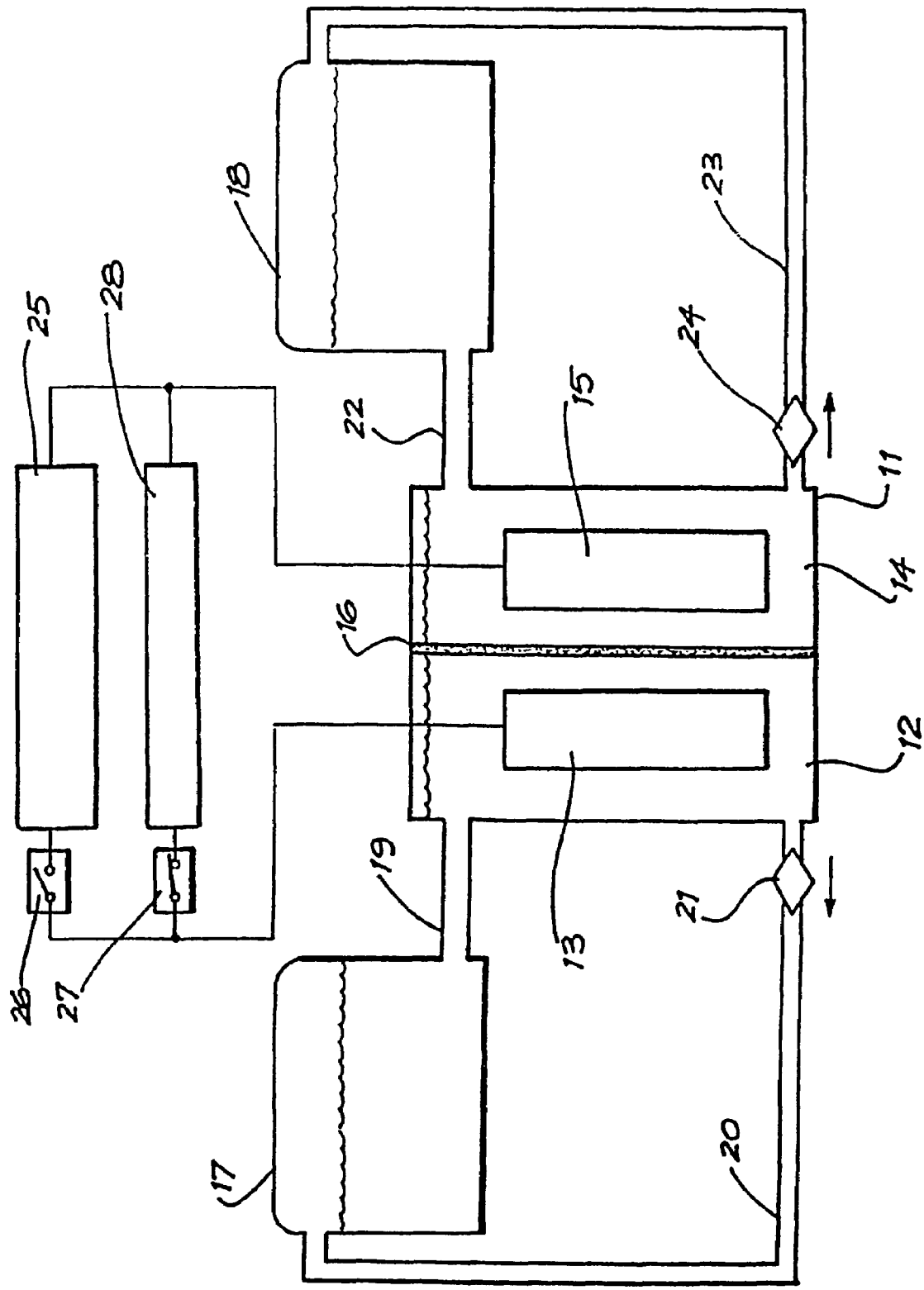

The present invention relates to novel redox flow cells. In particular, the present invention relates to novel redox flow cells comprising a polyhalide/halide redox couple in the positive half-cell electrolyte and the V(III)/V(II) redox couple in the negative half-cell electrolyte. The invention also relates to a method of producing electricity by discharging a fully charged or partially charged redox flow cell of the present invention, and a method of charging a discharged or partially discharged redox flow cell of the present invention.

BACKGROUND

A redox flow cell (also called a redox flow battery) is an electrochemical system which allows energy to be stored in two electrolytes containing different redox couples with electrochemical potential sufficiently separated from each other to provide an electromotive force to drive the oxidation-reduction reactions needed to charge and discharge the cell.

A redox flow cell comprises a positive compartment and a negative compartment. The positive compartment contains an electrolyte containing redox ions which are in a oxidised state and are to be reduced during the discharging process of the redox flow cell, or are in a reduced state and are to be oxidised during the charging process of the redox flow cell, or a mixture of such ions. The electrolyte in the positive compartment is in electrical contact with a positive electrode. The combination of the positive compartment, the electrolyte and the positive electrode is referred to as the "positive half-cell". The negative compartment contains an electrolyte containing redox ions which are in a reduced state and are to be oxidised during the discharging process of the redox flow cell, or are in an oxidised state and are to be reduced during the charging process of the redox flow cell, or a mixture of such ions. The electrolyte in the negative compartment is in electrical contact with a negative electrode. The combination of the negative compartment, the electrolyte and the negative electrode is referred to as the "negative half-cell". The electrolyte in the positive compartment and the electrolyte in the negative compartment are separated by an ionically conducting separator, typically an ion exchange membrane, to provide ionic communication between the electrolyte in the positive compartment and the electrolyte in the negative compartment.

Of the redox flow cells developed to date, the all-vanadium redox flow cell has shown long cycle life and high energy efficiencies of over 80% in large installations of up to 500 kW in size. The all-vanadium redox flow cell contains the V(V)/V(IV) redox couple in the positive half-cell electrolyte, and the V(III)/V(II) redox couple in the negative half-cell electrolyte. While the performance characteristics of the all-vanadium redox flow cell have made it well suited to various stationary applications, its relatively low energy density has to date limited its application in some fields, for example, in electric vehicles or other mobile applications.

The energy density of a redox flow cell is related to the concentration of the redox ions in the electrolyte in both half-cells, the cell potential and the number of electrons transferred during discharge per mole of active redox ions. V(V) salts have low solubility in most electrolytes. For all-vanadium redox flow cells, the highest concentrations of V(V) ions achieved to date have been achieved using sulphuric acid as the supporting electrolyte. In the case of the all-vanadium redox flow cell, the maximum vanadium ion concentration that can be employed for wide temperature range operations is typically 2 M or less. This concentration represents the solubility limit of the V(II) and/or V(III) ions in the sulphuric acid supporting electrolyte at temperatures below 5° C. and the stability of the V(V) ions in the sulphuric acid supporting electrolyte at temperatures above 40° C. V(V) ions in a sulphuric acid solution are subject to thermal precipitation at temperatures over 40° C.

Aqueous hydrochloric acid is unsuitable for use as the supporting electrolyte in all-vanadium redox flow cells as V(V) ions are reduced by chloride ions giving rise to chlorine gas and the formation of V(IV) ions.

It would be advantageous to develop alternative redox flow cells, which, in at least preferred embodiments, can achieve a higher energy density than conventional all-vanadium redox flow cells.

SUMMARY OF THE INVENTION

In a first aspect, the present invention provides a redox flow cell comprising a positive half-cell and a negative half-cell, the positive half-cell containing an electrolyte containing a polyhalide/halide redox couple, and the negative half-cell containing an electrolyte containing the V(III)/V(II) redox couple.

In a second aspect, the present invention provides a negative half-cell electrolyte containing the V(III)/V(II) redox couple when used in the redox flow cell according to the first aspect of the present invention.

In a third aspect, the present invention provides a positive half-cell electrolyte containing a polyhalide/halide redox couple when used in the redox flow cell according to the first aspect of the present invention.

In a fourth aspect, the present invention provides a redox flow cell having a positive compartment containing an electrolyte in electrical contact with a positive electrode, said electrolyte containing polyhalide ions, halide ions capable of being oxidised to form polyhalide ions, or a mixture of polyhalide ions and halide ions capable of being oxidised to form polyhalide ions, a negative compartment containing an electrolyte in electrical contact with a negative electrode, said electrolyte containing vanadium (III) ions, vanadium (II) ions, or a mixture of vanadium (III) ions and vanadium (II) ions, and an ionically conducting separator disposed between said positive compartment and said negative compartment and in contact with the electrolyte in said positive compartment and the electrolyte in said negative compartment to provide ionic communication between the electrolyte in said positive compartment and the electrolyte in said negative compartment.

The present invention also relates to a method of producing electricity by discharging a fully charged or partially charged redox flow cell of the present invention, and a method of charging a discharged or partially discharged redox flow cell of the present invention.

In another aspect, the present invention provides a process for producing electricity, comprising withdrawing electrical energy from a redox flow cell according to the fourth aspect of the present invention, wherein the electrolyte in the negative compartment contains some vanadium(II) ions and the electrolyte in the positive compartment contains some polyhalide ions, by loading an external circuit in electronic communication with the positive electrode and the negative electrode of the redox flow cell.

In another aspect, the present invention provides a process for charging a redox flow cell according to the fourth aspect of the present invention, wherein the electrolyte in the negative compartment contains some vanadium(III) ions and the electrolyte in the positive compartment contains some halide ions capable of being oxidised to form polyhalide ions, comprising providing electrical energy from an external energy source to the positive and negative electrodes of the redox flow cell to produce divalent vanadium ions in the electrolyte in the negative compartment and polyhalide ions in the electrolyte in the positive compartment.

Preferably the polyhalide/halide redox couple is $ClBr_2^-/Br^-$, $BrCl_2^-/Cl^-$ or $Br_3^-/Br^-$.

The electrolyte in the negative half-cell typically comprises the V(III)/V(II) redox couple in a supporting electrolyte. Similarly, the electrolyte in the positive half-cell typically comprises the polyhalide/halide redox couple in a supporting electrolyte. Preferably the supporting electrolyte is selected from aqueous solutions of HCl, HBr, mixtures of NaCl and HCl, mixtures of KCl and HCl, mixtures of HBr and NaBr, mixtures of HBr and KBr, or mixtures thereof.

In a preferred redox flow cell according to the present invention the electrolyte in the negative half-cell comprises $VCl_2$ and/or $VCl_3$ dissolved in a supporting electrolyte, and the electrolyte in the positive half-cell comprises $ClBr_2^-/Br^-$ and/or $BrCl_2^-/Cl^-$ redox couples in a supporting electrolyte. For such a redox flow cell, it is preferred that the supporting electrolyte in both half-cells is selected from aqueous solutions of HCl, a mixture of NaCl and HCl, a mixture of KCl and HCl, or mixtures thereof. In an alternative preferred redox flow cell according to the present invention, the electrolyte in the negative half-cell comprises $VBr_3$ and/or $VBr_2$ dissolved in a supporting electrolyte, and the electrolyte in the positive half-cell comprises $Br_3^-/Br^-$, $ClBr_2^-/Br^-$ and/or $BrCl_2^-/Cl^-$ redox couples in a supporting electrolyte. For such a redox flow cell, it is preferred that the supporting electrolyte is selected from aqueous solutions of HBr, HCl, a mixture of HBr and NaBr, a mixture of HBr and KBr, or mixtures thereof. Such redox flow cells are preferred to minimise potential cross-contamination of the electrolytes in the positive and negative half-cells during repeated charging and discharging of the redox flow cell, however, some diffusion of the vanadium and halide ions will always occur in practice.

BRIEF DESCRIPTIONS OF THE DRAWINGS

FIG. 1: shows a block diagram of a redox flow cell according to the present invention, having a reservoir for the electrolyte for the positive half-cell and a reservoir for the electrolyte for the negative half-cell.

Figure 2:
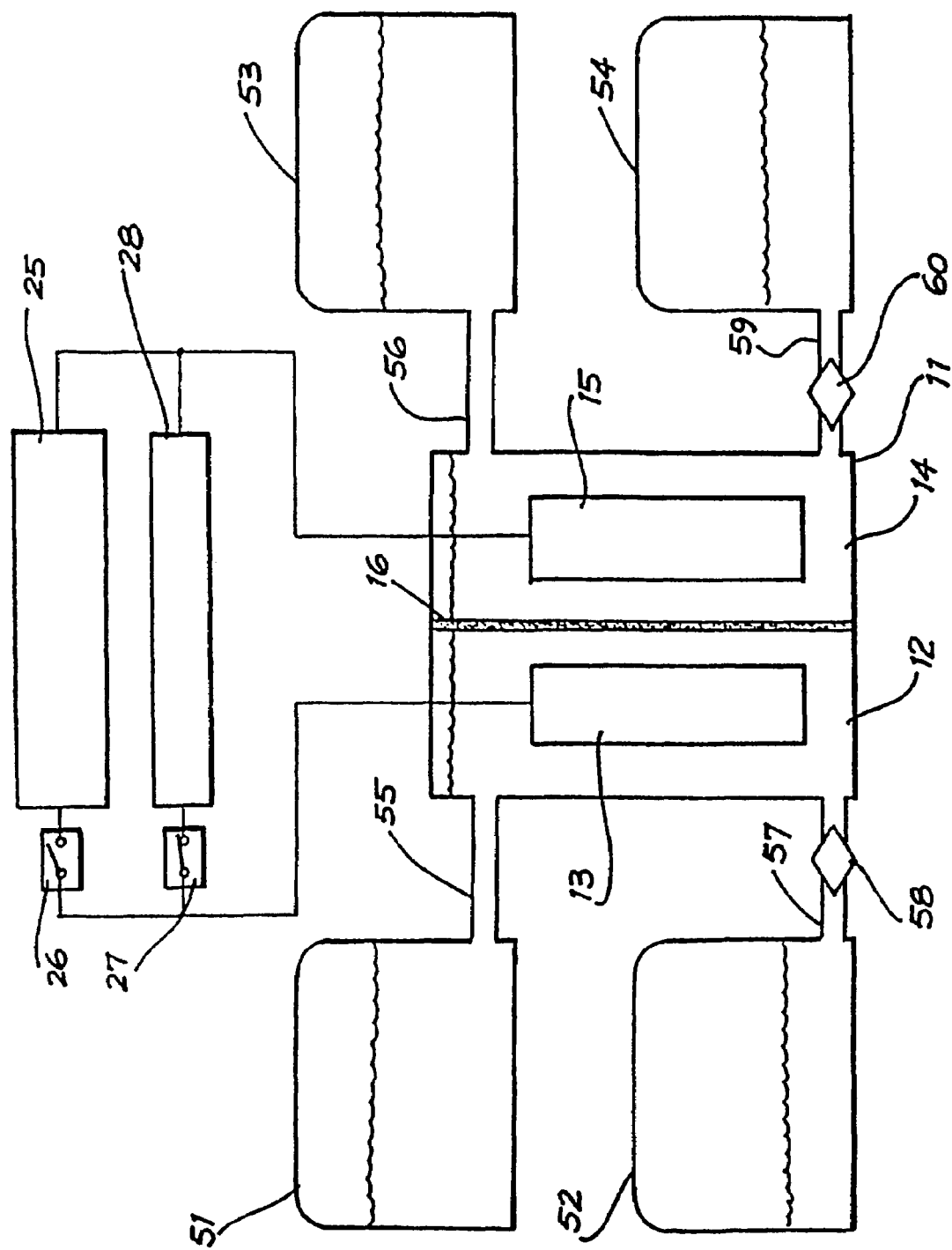

FIG. 2: shows a block diagram of an alternative redox flow cell according to the present invention having charge reservoirs and storage reservoirs for the electrolytes for the positive and negative half-cells.

Figure 3:
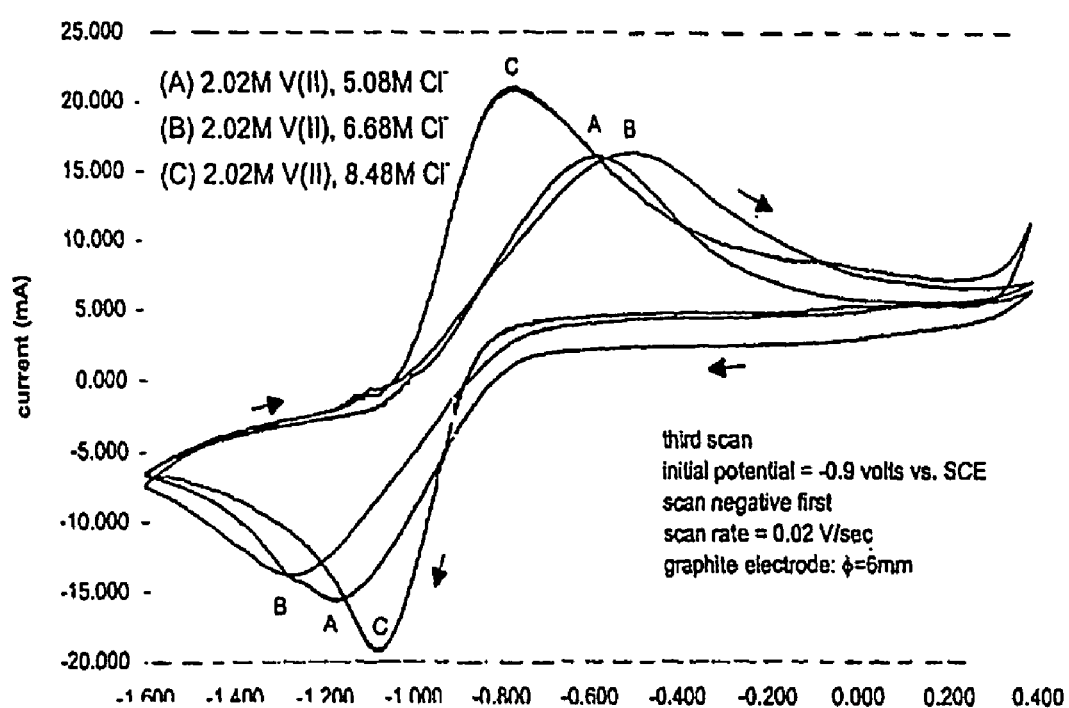

FIG. 3: shows a series of cyclic voltamograms obtained at a graphite electrode in aqueous solutions containing 2.02 M $VCl_2$ in various concentrations of total $Cl^-$ ions ((A) 5.08 M, (B) 6.68 M and (C) 8.48 M). The X axis shows the electrode potential in volts versus the saturated calomel electrode (SCE), and the Y axis shows the current.

Figure 4:
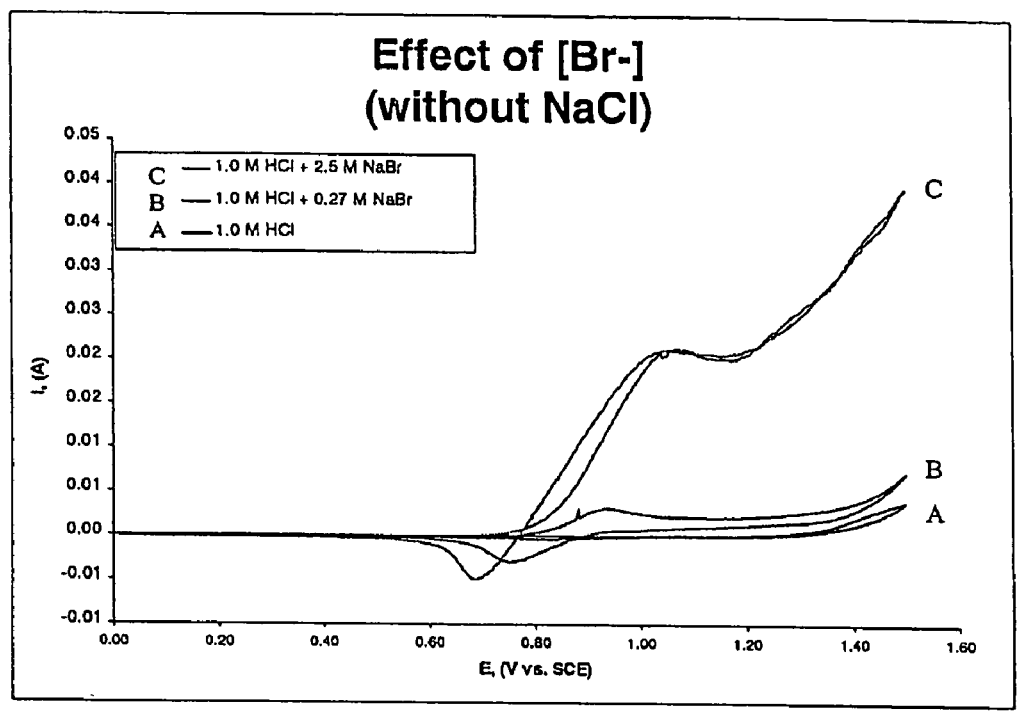

FIG. 4: shows a series of cyclic voltamograms obtained in aqueous solutions of 1.0 M HCl (lower curve), 1.0 M HCl+0.27 M NaBr (middle curve) and 1.0 M HCl+2.5 M NaBr (top curve).

Figure 5:
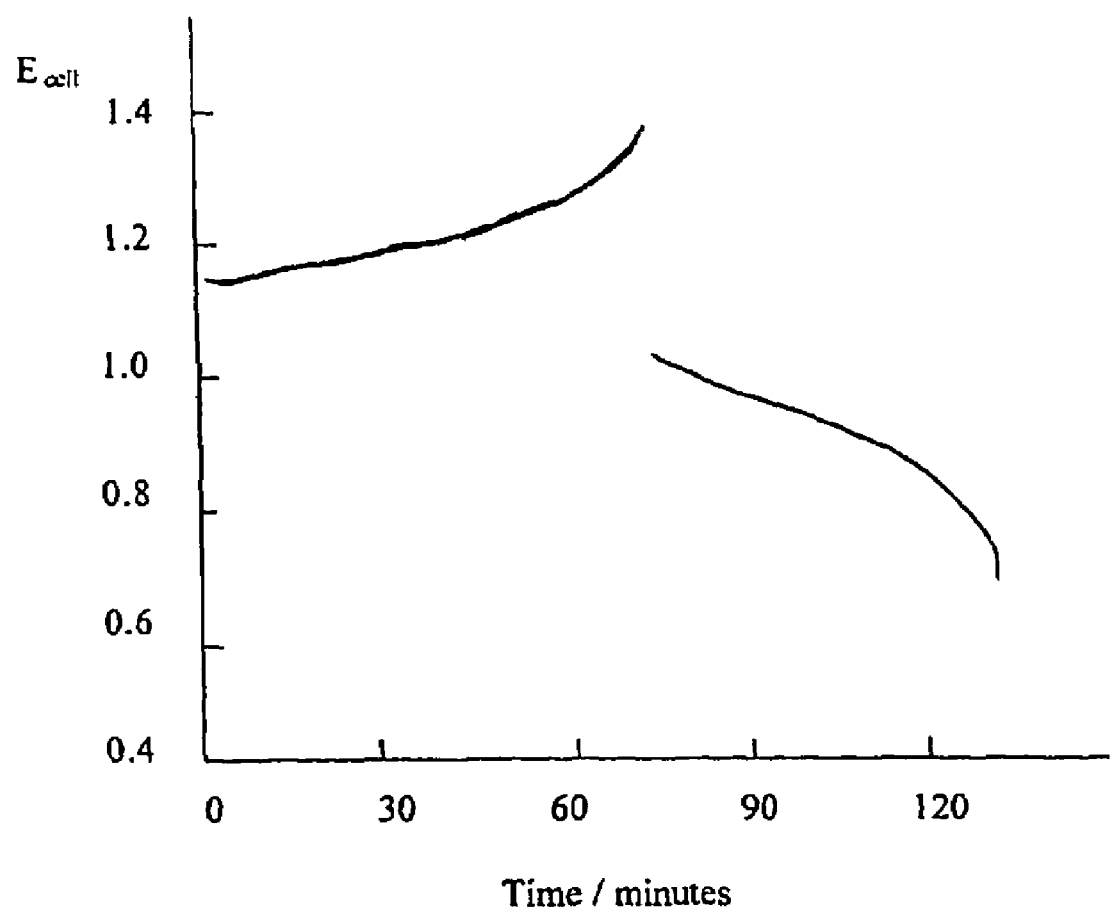

FIG. 5: shows the plot of cell voltage versus time obtained for a full charge-discharge cycle for a redox flow cell according to the present invention employing 1 M $VCl_3$ in 1.5 M aqueous HCl in the negative half-cell and 1 M NaBr in 1.5 M aqueous HCl in the positive half-cell.

DETAILED DESCRIPTION OF THE INVENTION

As used herein, the term "polyhalide" refers to any ion consisting of three or more halogen atoms, such as $Br_3^-$, $ClBr_2^-$, $BrCl_2^-$, $ICl_2^-$, $IBr_2^-$ and $I_3^-$. A polyhalide is formed by the complexing reaction between a halogen molecule and a halide ion. For example:

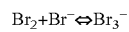

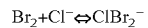

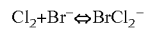

The formation of the polyhalide ion allows the halogen molecule to be complexed so that it does not escape from solution as a gaseous product.

As used herein, the term "redox couple" refers to a combination of a reduced and an oxidised form of a particular ion or neutral species, that, in a supporting electrolyte in a half-cell of a redox flow cell, undergoes oxidation from the reduced form to the oxidised form during the charging or discharging of the redox flow cell and undergoes reduction from the oxidised form to the reduced form during the discharging or charging of the redox flow cell. As will be appreciated by persons skilled in the art, in a fully charged or discharged redox flow cell, all or substantially all of the redox couples in each half-cell may be in the reduced or the oxidised form. As used herein, the term "redox couple" encompasses the situation where all or substantially all of the redox couple is present in the oxidised or the reduced form, as well as the situation where some of the redox couple is present in the oxidised form and the remainder is present in the reduced form. The term "V(III)/V(II) redox couple" refers to the redox couple consisting of the $V^{3+}$ and $V^{2+}$ ions. The term "polyhalide/halide redox couple" refers to a redox couple consisting of a polyhalide ion and the corresponding halide ion or ions.

As used herein, the term "electrolyte" refers to a solution which conducts current through ionisation.

As used herein, the term "supporting electrolyte" refers to an electrolyte capable of supporting the oxidised and reduced forms of a redox couple, and corresponding cations or anions to balance the charge of the redox ions, in solution during the oxidation and reduction of the redox couple. The supporting electrolyte also provides additional ions in solution to increase the conductivity of the solution and support the flow of current in the cell. It may also form ion pairs or complexes with the electroactive ion to enhance its electrochemical activity and solubility.

The present invention provides a redox flow cell comprising a positive half-cell and a negative half-cell, the positive half-cell containing an electrolyte containing a polyhalide/halide redox couple, and the negative half-cell containing an electrolyte containing the V(III)/V(II) redox couple.

The electrolyte containing the polyhalide/halide redox couple typically comprises the polyhalide/halide redox couple in a supporting electrolyte. The electrolyte containing the V(III)/V(II) redox couple typically comprises the V(III)/V(II) redox couple in a supporting electrolyte. Typically the supporting electrolyte is selected from aqueous solutions of HCl, HBr, a mixture of NaCl and HCl, a mixture of KCl and HCl, a mixture of HBr and NaBr, a mixture of HBr and KBr, or mixtures thereof, in a concentration range from 0.1 to 12 M, more typically 0.1 to 8 M, or even more typically from 0.5 to 6 M. The supporting electrolyte for the polyhalide/halide redox couple is typically an excess amount of the acid halide or halide salt that is added to increase the conductivity of the electrolyte solution, adjust the pH and increase the stability of the polyhalide complex in solution. While the supporting electrolyte in each half-cell may be different, it is preferred that the same supporting electrolyte is used in both half-cells to reduce cross contamination problems.

Various types of polyhalide ions are known to exist. The polyhalide ions, $ClBr_2^-$, $BrCl_2^-$ and $Br_3^-$ are characterised by high oxidation potentials. Preferred polyhalide/halide redox couples for use in the redox flow cell of the present invention are $BrCl_2^-/Cl^-$, $ClBr_2^-/Br^-$ and $Br_3^-/Br^-$, especially preferred are $BrCl_2^-/Cl^-$ and $ClBr_2^-/Br^-$. Other polyhalide/halide redox couples which could be used include $ICl_2^-/Cl^-$, $IBr_2^-/Br^-$ and $I_3^-/I^-$.

An electrolyte containing the polyhalide/halide redox couple may be prepared by means known in the art for preparing an aqueous solution containing halide ions, for example, dissolving acids and/or salts of a halide or mixture of halides in water. Polyhalide ions may be formed by oxidising the halide ions in the solution, either during the charging of the redox flow cell, or prior to the solution being introduced in the positive half-cell of the redox flow cell. The electrolyte containing the polyhalide/halide redox couple may also be prepared by dissolving a halogen molecule in an aqueous solution containing a halide ion. For example, dissolving $Br_2$ in an aqueous solution of $Cl^-$ or $Br^-$ ions, or dissolving $Cl_2$ in an aqueous solution of $Br^-$ or $I^-$ ions.

When the polyhalide/halide redox couple in the positive half-cell electrolyte is $ClBr_2^-/Br^-$, $Br_3^-/Br^-$, $BrCl_2^-/Cl^-$ or a mixture thereof, the concentration of the polyhalide in the electrolyte in the positive half-cell, when the redox flow cell is fully charged, is typically 0.1 to 5 M, more typically 0.5 to 5 M, and even more typically 1 to 3M or 1 to 2M. When the redox flow cell is fully discharged, the electrolyte in the positive half-cell typically contains $Cl^-$ and $Br^-$ ions in a total concentration of 1 to 12 M.

An electrolyte containing the V(III)/V(II) redox couple can be prepared by dissolving $VCl_3$ or $VBr_3$ in an aqueous acid, typically aqueous HCl or HBr, and optionally, electrochemically reducing some or all of the trivalent vanadium ions to divalent vanadium ions. An electrolyte containing the V(III)/V(II) redox couple can also be prepared by dissolving vanadium trioxide, $V_2O_3$, in an aqueous solution of HCl, HBr, NaCl, NaBr, KCl, KBr or mixtures thereof. Since vanadium trioxide has a slower dissolving rate than $VCl_3$ or $VBr_3$, it is preferred that the dissolution of $V_2O_3$ is carried out at elevated temperatures above 40° C.

An electrolyte containing the V(III)/V(II) redox couple can also be prepared by mixing solid $V_2O_3$ and solid $V_2O_5$ powders in a halide aqueous solution at elevated temperatures above 40° C. until the powders dissolve to produce a solution of V(IV) halide or V(IV)/V(III) halide mixture, and then reducing the solution in the redox cell or in a separate electrolysis cell to generate V(III) and/or V(II) ions in solution.

A further method for producing an electrolyte containing the V(III)/V(II) redox couple involves the addition of $V_2O_5$ powder to an HCl solution of the required halide concentration and allowing the reduction of the V(V) by the halide ions to dissolve the pentoxide powder to form the corresponding soluble V(IV) halide with the evolution of chlorine gas. The halide concentration can then be adjusted by the addition of the required amount of HCl to the final solution which can be further reduced in the redox cell or in a separate electrolysis cell to produce V(II) and/or V(III) ions in the electrolyte.

Concentrations of V(II) and/or V(III) ions as high as 6 M total vanadium can be achieved in acids such as aqueous HCl or HBr, while solutions of 4 M V(II) or 4 M V(III) can readily be prepared. This is a much higher concentration of V(III) and/or V(II) ions than the total vanadium concentration of V(II) and/or V(III) ions in the negative half-cell electrolyte of conventional all-vanadium redox flow cells where the supporting electrolyte is sulphuric acid. Accordingly, much higher energy densities can be achieved using the redox flow cell of the present invention compared to conventional all-vanadium redox flow cells. The redox flow cell of the present invention can therefore be used for the storage and later production of electrical energy in a wide range of applications.

The concentration of vanadium (II) and/or vanadium (III) ions in the electrolyte in the negative half-cell of the redox flow cell of the present invention is typically 0.1 to 6 M total vanadium, more typically from 0.5 to 5 M or 1 to 5 M, and even more typically 1 to 4 M.

In some preferred embodiments of the present invention, the electrolyte in the negative half-cell comprises $VCl_2$ and/or $VCl_3$ dissolved in a supporting electrolyte selected from the group consisting of aqueous HCl, an aqueous solution of NaCl and HCl, an aqueous solution of KCl and HCl, or mixtures thereof. In some embodiments, the electrolyte comprises from 0.5 to 5 M $VCl_3$ and/or $VCl_2$ dissolved in a supporting electrolyte selected from 0.5 to 10 M aqueous HCl, 0.5 to 10 M aqueous solution of a NaCl and HCl mixture, 0.5 to 10 M aqueous solution of a KCl and HCl mixture, or mixtures thereof.

In another preferred embodiment of the present invention, the electrolyte in the negative half-cell comprises $VBr_2$ and/or $VBr_3$ dissolved in a supporting electrolyte selected from the group consisting of aqueous HBr, aqueous HCl, an aqueous solution of NaBr and HBr, an aqueous solution of KBr and HBr, or mixtures thereof. In some embodiments, the electrolyte comprises from 0.5 to 5 M $VBr_3$ and/or $VBr_2$ dissolved in a supporting electrolyte selected from 0.5 to 10 M aqueous HBr, 0.5 to 10 M aqueous HCl, 0.5 to 10 M aqueous solution of a NaBr and HBr mixture, 0.5 to 10 M aqueous solution of a KBr and HBr mixture, or mixtures thereof.

In another preferred embodiment of the present invention, the electrolyte in the negative half-cell comprises $VCl_2$ and/or $VCl_3$ dissolved in a supporting electrolyte selected from the group consisting of aqueous HBr, an aqueous solution of NaBr and HBr, an aqueous solution of KBr and HBr, or mixtures thereof. In some embodiments, the electrolyte comprises from 0.5 to 5 M $VCl_3$ and/or $VCl_2$ dissolved in a supporting electrolyte selected from 0.5 to 10 M aqueous HBr, 0.5 to 10 M aqueous solution of a NaBr and HBr mixture, 0.5 to 10 M aqueous solution of a KBr and HBr mixture, or mixtures thereof.

The charge-discharge reactions in preferred redox flow cells of the present invention are:

Negative Half-Cell Reactions:

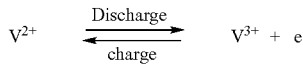

Positive Half-Cell Reactions:

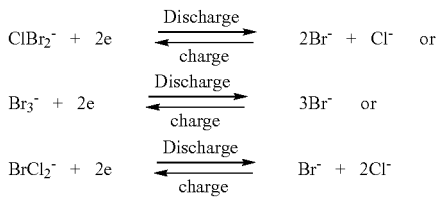

The electrolytes in the positive and negative half-cells of the redox flow cell of the present invention are separated by an ionically conducting separator to provide ionic communication between the electrolytes in the positive and negative half-cells. The ionically conducting separator is typically an ion exchange membrane. The ion exchange membrane may be either a cation exchange membrane which would allow the transfer of the charge carrying $H^+$, $Na^+$ and/or $K^+$ ions depending on the composition of the electrolytes, or an anion exchange membrane which would allow the transfer of charge by halide ions such as $Cl^-$ and/or $Br^-$ ions. As the hydrogen ions are very small, they are also able to migrate across an anion exchange membrane.

Preferably the ion exchange membrane is a cation exchange membrane. Such a membrane is preferred so that the transfer of the polyhalide and/or halide ions is minimised. The cation exchange membrane may be any cation ion exchange membrane having good chemical stability when in contact with the electrolyte containing the polyhalide ions, low electrical resistivity and low permeability for polyhalide/halide ions in the positive half-cell electrolyte and the vanadium ions in the negative half-cell electrolyte.

Typically, the cation exchange membrane is a prefluorinated membrane such as Nafion 112 (Du Pont), Nafion 117 (Du Pont), or other Nafion cation exchange membranes. Other suitable cations exchange membranes include Gore Select membranes such as Gore Select P-03430 (W. L. Gore), a Flemion membrane, or Selemion CMV cation exchange membrane.

Suitable anion exchange membranes are polysulphone based membranes such as New Selemion Type 2, New Selemion Type H, or a Tokuyame AFN-R membrane.

The positive and negative electrodes in the redox flow cell of the present invention are typically porous carbon or graphite felt, matte or cloth materials on a graphite, glassy carbon or conducting plastic substrate. The graphite or carbon felt can also be hot pressed onto a polyethylene or polypropylene sheet to form a bipolar electrode according to the design and method described in WO 00/57507 (PCT/AU00/00241). The positive electrode may also be a oxide coated titanium metal sheet or expanded metal mesh. Such a titanium based electrode provides greater long term stability against oxidation during charging of the positive half-cell.

In some embodiments of the invention, the electrolyte in the positive half-cell may contain, in addition to the polyhalide/halide redox couple, one or more other redox couples. Similarly, in some embodiments of the invention, the electrolyte in the negative half-cell may contain, in addition to the V(III)/V(II) redox couple, one or more other redox couples. The electrolyte in the negative and positive half-cells may be gelled using fumed silica as a gelling agent to provide a gelled vanadium halide/polyhalide redox battery. In this case, the electrolytes would be fully contained within the half-cells and there would be no external tanks or pumps to pump the electrolytes through the cell stack. A gelled electrolyte cell or battery would be useful in applications where energy is only required for short periods of time such as in hybrid electric vehicles. The gelled electrolyte can be prepared by mixing 1-3% fumed silica into the electrolyte solution and quickly filling the half-cell containers before gellation has occurred.

Two embodiment of the redox flow cell of the present invention will now be described, by way of example only, with reference to FIGS. 1 and 2.

FIG. 1 shows a redox flow cell according to the present invention. The redox flow cell 11 has a negative compartment 12 with a negative electrode 13 and a positive compartment 14 with a positive electrode 15. The negative compartment 12 contains an electrolyte containing the V(III)/V(II) redox couple, the electrolyte being in electrical contact with the negative electrode 13. The positive compartment 14 contains a electrolyte containing a polyhalide/halide redox couple, the electrolyte being in electrical contact with the positive electrode 15.

Redox flow cell 11 includes ionically conducting separator 16 disposed between positive and negative compartments 12 and 14, and in contact with the electrolyte in each compartment to provide ionic communication therebetween.

The electrolyte containing the V(III)/V(II) redox couple is prepared by dissolving $VCl_3$ or $V_2O_3$ in aqueous HCl, aqueous HBr or a mixture thereof to form a solution of trivalent vanadium ions, and this solution is loaded into reservoir 17 and negative compartment 12.

The electrolyte containing a polyhalide/halide redox couple is prepared by preparing a solution of an acid and/or salt of the relevant halide or halides in water. This solution is then loaded into reservoir 18 and positive compartment 14.

The electrolyte containing the V(III)/V(II) redox couple is pumped through the negative compartment 12 and reservoir 17 via supply and return lines 19 and 20 via pump 21, and simultaneously the electrolyte containing the polyhalide/halide redox couple is pumped through positive compartment 14 and reservoir 18 via supply and return lines 22 and 23 via pump 24.

Redox flow cell 11 is charged by providing electrical energy from power source 25 to positive and negative electrodes 15 and 13 by closing switch 26 and opening switch 27 to derive divalent vanadium ions in the electrolyte in compartment 12 and polyhalide ions in the electrolyte in compartment 14.

Electricity is produced by redox flow cell 11 by opening switch 26, closing switch 27 and withdrawing electrical energy via load 28 which is in electrical communication with negative and positive electrodes 15 and 13.

Redox flow cell 11 may be recharged by opening switch 27, closing switch 26 and providing electrical energy from power source 25.

An alternatively configured redox flow cell according to the present invention will now be described with reference to FIG. 2. FIG. 2 shows a redox flow cell 11, power source 25 and load 28 similar to that shown in FIG. 1 but in which the reservoirs 17 and 18 of FIG. 1 have been replaced by charge and storage reservoirs 51 and 52 for the electrolyte containing the polyhalide/halide redox couple. Charge reservoir 51 delivers or receives further electrolyte to or from negative compartment 12 via the charge supply/return line 55. Similarly, charge reservoir 53 delivers/receives electrolyte to or from positive compartment 14 via charge supply/return line 56. Electrolyte is pumped from or to negative compartment 12 to or from storage reservoir 52 via storage supply/return line 57 by pump 58 and analogously electrolyte is pumped from or to positive compartment 14 to or from storage reservoir 54 via storage supply/return line 59 by pump 60.

The charging, recharging and electrical production processes of the redox flow cell shown in FIG. 2 are carried out in a similar manner as those described above for the redox flow cell shown in FIG. 1 except that the processes in the negative and positive compartments 12 and 14 are performed as batch processes rather than the recirculation procedure of FIG. 1.

EXAMPLE 1

Experiments were conducted to examine the electrochemical reversibility of the V(III)/V(II) redox couple in different concentrations of chloride ions in aqueous HCl.

FIG. 3 shows a series of cyclic voltamograms obtained at a graphite electrode in solutions containing 2.02 M $VCl_2$ in various concentrations of total $Cl^-$ ((A) 5.08 M $Cl^-$, (B) 6.68 $Cl^-$ and (C) 8.48 M $Cl^-$). The X axis shows the electrode potential in volts versus the saturated calomel electrode (SCE). Increasing the chloride ion concentration appears to shift the peak potentials, but an anodic peak is observed at a potential of around −0.75 V in the solution containing 8.48 M total $Cl^-$ ions while the corresponding cathodic peak appears at approximately −1.07. V. The formal potential of the V(III)/V(II) redox couple is thus seen to be at around −0.95V, which is very suitable for use in the negative half-cell of a redox flow battery. Another favourable feature is the absence of any significant hydrogen evolution current at potentials below the V(III) reduction peak. This indicates that there will not be serious gassing problems at the negative electrode during the charging of a redox flow cell employing the V(III)/V(II) redox couple in an aqueous hydrochloride supporting electrolyte in the negative half-cell.

EXAMPLE 2

A series of cyclic voltamograms were obtained in aqueous solutions of 0.1 M HCl, 1.0 M HCl+0.27 M NaBr and 1.0 M HCl+2.5 M NaBr. The results are shown in FIG. 4. From the lower curve (1.0 M HCl) it can be seen that scanning the electrode in the positive direction, gives rise to an anodic current associated with $Cl_2$ and/or $O_2$ evolution. No cathodic peak is observed on reserving the scan potential, thus showing no electrochemically reversible products are produced at the electrode surface during the positive scan. However, when NaBr is present in the electrolyte, anodic and cathodic peaks appear in the forward and reverse scans respectively, showing that a reversible redox couple reaction with a formal potential of approximately 0.85 V versus SCE, is occurring at the electrode (middle curve). When the concentration of the NaBr is increased to 2.5 M (top curve), the height of the anodic peak increases significantly, showing that the $Br^-$ ions are in fact oxidised at the electrode surface to produce an electrochemically active product which can be reduced back to $Br^-$ ions on the reverse scan. The reactions occurring at the electrode can be represented by the following:

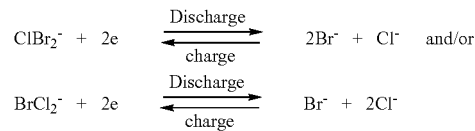

The reversible nature of these reactions demonstrates that the $ClBr_2^-/Br^-$ and/or $BrCl_2^-/Cl^-$ redox couples are suitable candidates for use in a redox flow cell.

EXAMPLE 3

A redox flow cell according to the present invention was prepared using glassy carbon sheets as the current collectors and graphite felt as the electrode material in both half-cells. A piece of Nafion 112 membrane was used as the ion exchange membrane between the two half-cells and 50 mls of each of the two half-cell electrolytes was placed into the two half-cells. The electrolyte in the negative half-cell was 1.5 M aqueous HCl containing 1 M $VCl_3$, while the electrolyte in the positive half-cell was 1.5 M aqueous HCl containing 1 M NaBr. The solutions were pumped through the cell and a charging current of 20 mA/cm² applied. When the cell voltage began to increase rapidly, the charging current was switched off and the cell allowed to discharge at a current density of 20 mA/cm². FIG. 5 shows the plot of cell voltage versus time obtained for the full charge discharge cycle. From this plot, coulombic and voltage efficiency values were calculated as 83% and 80% respectively.

In the claims which follow and in the preceding description of the invention, except where the context requires otherwise due to express language or necessary implication, the word "comprising" is used in the sense of "including", i.e. the features specified may be associated with further features in various embodiments of the invention.

The invention claimed is:

1. A redox flow cell comprising a positive-half-cell and a negative half-cell, the positive half-cell containing an electrolyte containing a polyhalide/halide redox couple, and the negative half-cell containing an electrolyte containing the V(III)/V(II) redox couple.

2. The redox flow cell according to claim 1, wherein the electrolyte in the negative half-cell comprises $VCl_2$ and/or $VCl_3$ dissolved in a supporting electrolyte selected from the group consisting of aqueous HCl, an aqueous solution of NaCl and HCl, an aqueous solution of KCl and HCl, or mixtures thereof.

3. The redox flow cell according to claim 2, wherein the electrolyte in the negative half-cell comprises from 0.5 to 5 M $VCl_3$ and/or $VCl_2$ dissolved in a supporting electrolyte selected from 0.5 to 10 M aqueous HCl, 0.5 to 10 M aqueous solution of a NaCl and HCl mixture, 0.5 to 10 M aqueous solution of a KCl and HCl mixture, or mixtures thereof.

4. The redox flow cell according to claim 1 wherein the electrolyte in the negative half-cell comprises $VBr_2$ and/or VBr3 dissolved in a supporting electrolyte selected from the group consisting of aqueous HBr, aqueous HCl an aqueous solution of NaBr and HBr, an aqueous solution of KBr and HBr, or mixtures thereof.

5. The redox flow cell according to claim 4, wherein the electrolyte in the negative half-cell to 5 M VBr3 and/or VBr2 dissolved electrolyte selected from 0.5 to 10 M aqueous HBr, 0.5 to 10 M aqueous HCl, 0.5 to 10 M aqueous solution of a NBr and HBr mixture, 0.5 to 10 M aqueous solution of a KBr and HBr mixture, or mixtures thereof.

6. The redox flow cell according to claim 1, wherein the electrolyte in the positive half-cell contains a polyhalide/halide redox couple selected from $ClBr_2^-/Br^-$, $Br_3^-/Br^-$ or $BrCl_2^-/Cl^-$.

7. The redox flow cell according to claim 6, wherein, when the redox flow cell is fully discharged, the electrolyte in the positive half-cell, contains $Cl^-$ and $Br^-$ ions in a total concentration of 1 to 12 M.

8. The redox flow cell according to claim 6, wherein, when the redox flow cell is fully charged, the electrolyte in the positive half-cell contains the polyhalide $ClBr_2^-$, $Br_3^-$, $BrCl_2^-$, or a mixture thereof, in a total polyhalide concentration of 0.5 to 5 M.

9. A redox flow cell having a positive compartment containing an electrolyte in electrical contact with a positive electrode, said electrolyte containing polyhalide ions, halide ions capable of being oxidized to form polyhalide ions, or a mixture of polyhalide ions and halide ions capable of being oxidized to form polyhalide ions, a negative compartment containing an electrolyte in electrical contact with a negative electrode, said electrolyte containing vanadium (III) ions, vanadium (II) ions or a mixture of vanadium (III) ions and vanadium (II), and an ionically conducting separator disposed between said positive compartment and said negative compartment and in contact with the electrolyte in said positive compartment and the electrolyte in said negative compartment to provide ionic communication between the electrolyte in said positive compartment and the electrolyte in said negative compartment.

10. A process for producing electricity, comprising withdrawing electrical energy from a redox flow cell according to claim 1, wherein the electrolyte in the negative compartments contains some vanadium (II) ions and the electrolyte in the positive compartment contains some polyhalide ions, by loading an external circuit in electronic communication with the positive electrode and the negative electrode of the redox flow cell.

11. A process for charging a redox flow cell according to claim 1, wherein the electrolyte in the negative compartment contains some vanadium (III ions) and the electrolyte in the positive compartment contains some halide ions capable of being oxidized to form polyhalide ions, comprising providing electrical energy from an external energy source to the positive and negative electrodes of the redox flow cell to derive divalent vanadium ions in the electrolyte in the negative compartment and polyhalide ions in the electrolyte in the positive compartment.

12. A redox flow cell according to claim 1 wherein the electrolyte in the negative and positive half-cells is gelled by the addition of fumed silica.

* * * * *